(12) United States Patent
Robichaud

(10) Patent No.: US 6,630,529 B2
(45) Date of Patent: Oct. 7, 2003

(54) BARRIER REDUCING PERMEATION OF HYDROCARBONS

(75) Inventor: Ronald T. Robichaud, Leominster, MA (US)

(73) Assignee: Greif Bros. Corp. of Ohio, Inc., Delaware, OH (US)

( * ) Notice: Subject to any disclaimer, the term of this patent is extended or adjusted under 35 U.S.C. 154(b) by 0 days.

(21) Appl. No.: 09/725,153

(22) Filed: Nov. 29, 2000

(65) Prior Publication Data

US 2001/0000037 A1 Mar. 15, 2001

Related U.S. Application Data

(62) Division of application No. 08/306,198, filed on Sep. 14, 1994, now abandoned, which is a continuation of application No. 07/945,846, filed on Sep. 16, 1992, now abandoned, which is a continuation of application No. 07/531,121, filed on May 31, 1990, now abandoned.

(51) Int. Cl.$^7$ .................................................. C08K 5/04
(52) U.S. Cl. ........................................................ 524/399
(58) Field of Search ......................................... 524/399

(56) References Cited

U.S. PATENT DOCUMENTS

| 4,423,188 A | * | 12/1983 | Witschard | .................... 525/71 |
| 4,675,356 A | * | 6/1987 | Miyata | ........................ 524/424 |

* cited by examiner

Primary Examiner—Peter D. Mulcahy
(74) Attorney, Agent, or Firm—Vorys, Sater, Seymour and Pease LLP

(57) ABSTRACT

The present invention is directed to a thermoplastic additive containing aluminum stearate and polyvinylidine fluoride which when added to thermoplastics such as polyethylene inhibits and reduces permeation of fluids stored within containers composed of the thermoplastic. The invention has been proven effective in reducing the permeation of hydrocarbon based materials.

4 Claims, No Drawings

BARRIER REDUCING PERMEATION OF HYDROCARBONS

This application is a division of Ser. No. 08/306,198 filed Sep. 14, 1994 now abandoned, which is a continuation of Ser. No. 07/945,846 filed Sep. 16, 1992 now abandoned, which is a continuation of Ser. No. 07/531,121 filed May 31, 1990 now abandoned.

BACKGROUND OF THE INVENTION

Polyethylene is a favored material used in constructing containers. It is cheaply produced as molded or extruded. However, polyethylene has serious drawbacks. When certain fluids such as hydrocarbon based materials are packaged in polyethylene containers, they have a tendency to seep through the container wall. This is due to the permeable nature of polyethylene.

SUMMARY OF THE INVENTION

It is an object of the invention to provide a thermoplastic additive which when blended with a thermoplastic serves as a barrier to the permeation of fluids, and in particular, hydrocarbon based materials.

It is a further object of the invention to provide a drum, bottle, container or the like capable of resisting permeation of fluids, and particularly, hydrocarbon based materials.

It is a further object of the invention to provide a thermoplastic additive which can be formed into a liner for containers of other materials, such as metal and paper products, which provides resistance to fluid permeation.

The present invention is a thermoplastic additive which is added to thermoplastics, particularly, polyethylene. The additive is comprised of a carrier thermoplastic, polyvinylidine fluoride, and aluminum stearate as a tie agent, binding the polyvinylidine fluoride and the carrier thermoplastic.

It is also possible to form the blend into a liner suitable for lining metal drums and containers of other materials, thereby serving as extra measure of protection against permeation.

Aluminum stearate is used as an agent capable of gelling or thickening aliphatic and aromatic hydrocarbons. In the present invention, its presence as an additive to thermoplastics or to thermoplastic liners reduces permeation through the container walls. If aliphatic or aromatic hydrocarbons penetrate the interior container wall or interior liner, the presence of aluminum stearate would cause a localized thickening, thereby preventing permeation.

EXAMPLE

The additive is prepared by mixing polyvinylidine fluoride (PVDF) and aluminum stearate with the carrier thermoplastic. The PVDF can be in either powderized or pelletized form. In this example, the thermoplastic is high molecular weight high density polyethylene (HMW-HDPE). The components of the blend were mixed in the following ratio:

| | |
|---|---|
| HMW-HDPE | 52 lbs. |
| PVDF | 48 lbs. |
| Aluminum stearate | 56 grms/cwt. |

Prior to mixing, the blend is covered. After mixing of the additive, it is suitable for a subsequent blending with a resin of the carrier. The subsequent blending creates a thermoplastic composite that resists and reduces permeation through its walls. It is preferred that after the subsequent mixing with the carrier thermoplastic, the additive comprise 3 to 6% of the total composition of the subsequent composite.

The blend may also be used as a thermoplastic liner for containers of other materials. The liner is applied to the containers by means known by those skilled in the art.

Test Data

Three drums were tested to determine the amount of permeation through the drum walls.

The drums were filled with xylene and then stored for a period of a year. Data reflecting the percentage of fluid permeating through the drum was compiled on a intermittent basis.

Drum #1 was a control drum possessing no permeation resistant additives. Drum #2 possessed a 3% permeation resistant additive as disclosed in the invention. Drum #3 possessed a 6% permeation resistant additive as disclosed in the invention.

| | | 30 day/50° C. | 12 weeks/50° C. | 1 year at ambient |
|---|---|---|---|---|
| | Drum #1 | 0.7% loss | 2.08% loss | 6.0% loss |
| 3% | Drum #2 | 0.4% loss | 1.1% loss | 4.7% loss |
| 6% | Drum #3 | 0.19% loss | 0.58% loss | 4.6% loss |

As can be seen, the drums containing the additive exhibit a resistance to permeation. The additive brings the drums into compliance with Department of Transportation regulations, which set a maximum of 0.5% loss at 50° C. for a thirty day period for hazardous materials, and 2% loss at 50° C. for a thirty day period at for non-hazardous materials.

I claim:

1. A drum for containing and transporting fluids and capable of resisting the permeation of fluids having a wall comprised of a thermoplastic composition comprising high molecular weight, high density polyethylene and an amount of a thermoplastic additive comprising a mixture of said high molecular weight, high density polyethylene, polyvinylidene fluoride and aluminum stearate effective to decrease the permeability of said composition to fluids.

2. The drum of claim 1, wherein said amount of said additive comprises from 3% to 6% by weight of said thermoplastic composition.

3. A container for containing and transporting fluids and capable of resisting the permeation of fluids having a wall comprised of a thermoplastic composition comprising high molecular weight, high density polyethylene and an amount of a thermoplastic additive comprising a mixture of said high molecular weight, high density polyethylene. polyvinlyidene fluoride and aluminum stearate effective to decrease the permeability of said composition to fluids, wherein said additive comprises 52 parts by weight of high molecular weight, high density polyethylene, 48 parts by weight of polyvinylidene fluoride and 56 grams of aluminum stearate per hundred pounds (45.4 kilograms) of said additive.

4. The container of claim 3, wherein said amount of said additive comprises from 3% to 6% by weight of said thermoplastic composition.

* * * * *